July 22, 1958  G. W. SMITH  2,843,964
DETACHABLE COUPLING FOR FISHHOOKS AND THE LIKE
Filed April 27, 1955
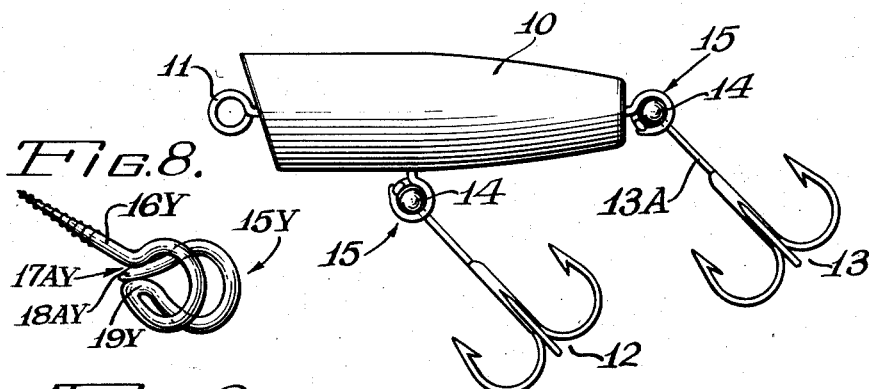
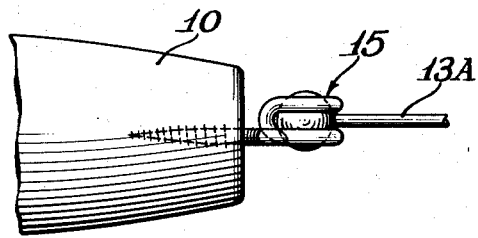
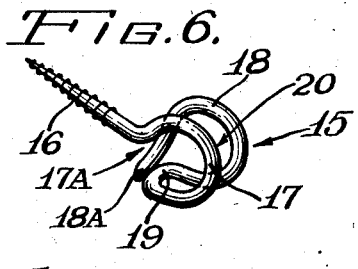
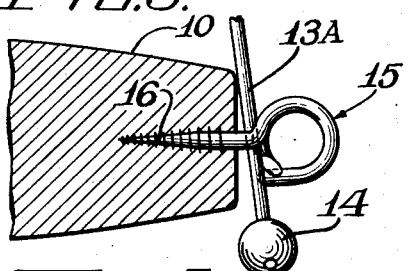
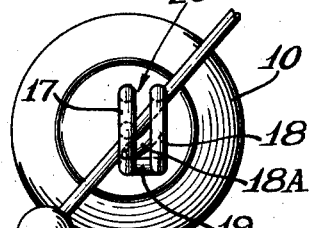
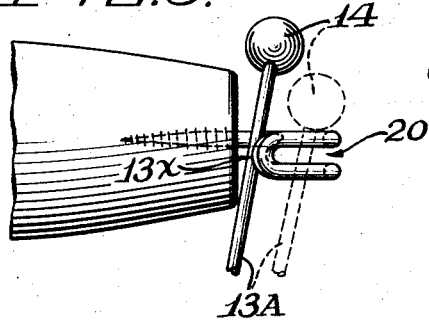
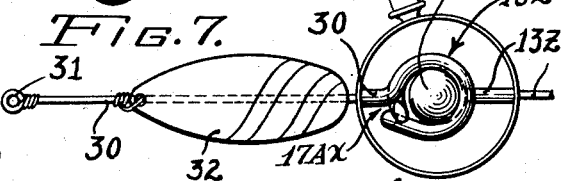
Inventor:
George W. Smith

2,843,964

DETACHABLE COUPLING FOR FISHHOOKS AND THE LIKE

George W. Smith, Coal City, Ill.

Application April 27, 1955, Serial No. 504,277

8 Claims. (Cl. 43—42.44)

This invention pertains to fishing tackle, particularly hooks for artificial baits or lures, and has as its principal object the provision of an economically manufactured, easily manipulated, detachable hook means for use with lures such as plugs, spoons, bait harnesses, and the like, enabling ready change of hook size and style (i. e. single or multiple hooks, etc.), as well as the disarming of baits for stowage in the tackle box by detachment of its hooks to avoid the annoying tangles commonly experienced with conventional hook structures.

It is a further object to provide a coupling means comprising a ball and stem formation and a socket therefore contrived of especially convoluted and spaced wire or rod means defining spaced-apart twin loops affording a loose receptacle for the ball portions and a nearly circular alley into or out of which the stem is worked to seat or free the ball portion while leaving freedom of movement for the stem in the seated condition.

Additional objects and aspects of novelty and utility inherent in the invention relate to details of the construction and operation of the illustrative embodiment described hereinafter in view of the annexed drawing in which:

Fig. 1 is a side elevation of a plug type lure equipped with the novel hook attaching means;

Fig. 2 is a fragmentary detail of one of the ends of the plug of Fig. 1 and the appertaining hook means, shown to enlarged scale;

Fig. 3 is a sectional detail through the plug fragment of Fig. 2 showing parts of the hook means in elevation;

Fig. 4 is an endwise elevational view of the plug with the hook shank in starting position;

Fig. 5 is a fragmentary bottom view of the plug positioned as in Fig. 4 and looking in a direction down upon the latter;

Fig. 6 is an enlarged perspective detail of one of the hook attaching members;

Fig. 7 shows a partially magnified view of a modified construction in which the loop socket means is integral with another member;

Fig. 8 is a perspective view of a modified construction of the loop socket means.

In Fig. 1 there is shown a conventional type of plug body 10 having the usual eye 11 to which a leader or line may be attached. A plurality of ganged hooks 12 and 13 are attached at spaced positions on the plug body by the novel means now to be described, namely, a spherical head or ball 14 secured at the free end of each hook shank or stem 13A, in combination with an especially formed wire socket member 15 attached to the plug body and having certain reentrantly curved formations permitting the ball head to be manipulated in a particular manner into and out of a seated position therein in which the hook still retains good freedom of movement comparable to that afforded by the old style attaching eyes.

The special socket members 15 are in the preferred configuration shown in Fig. 6 and consist of a length of suitable wire stock having a shank 16 on which a rolled screw threading is formed for attaching the device to the usual wooden or plastic plug body.

Appertaining portions of said length of wire are turned back against itself in two directions, laterally to form two side-by-side legs, which are then curved back reentrantly to form twin loops 17 and 18 of approximately circular curvature, these loops being joined at the point of inflection of the lateral bend by the lateral bight portion 19 which acts as a stop for the shank of the hook as will hereinafter appear.

One of the twin loop portions 17 does not form a complete circle but has an entrance passage 17A which provides a sidewise entrance for the ball head and shank when the same are properly manipulated in the coupling or separating operations described hereinafter. The companion loop 18, however, is substantially closed by the offset free end portion 18A thereof which crosses over (as in Figs. 3 and 4) toward the opposite loop and preferably bears against the bight 19 (as in Fig. 6).

It is important that the twin loops 17 and 18 be laterally spaced apart to afford a nearly-circular shank-run or alley 20 in which the shank of the hook or other member can oscillate when the ball head swivels and pivots in its seat between the spaced pair of loops.

In order to seat the hooks when arming the plug 10, the hook shank 13A is laid more or less crosswise of the stem of the socket member (as in Figs. 3, 4, and 5), with the ball head 14 at the open one of the loops 17 to be worked into the latter while the appertaining hook shank 13A is simultaneously passed under the crossed-over free end portion 18A into entrance 17A to be turned into the alley 20. These latter manipulations are best understood by reference to Fig. 5, in which the portion 13X of the shank needs only to be moved toward the right into the dotted-line position and then to be given a slight counterclockwise twist to bring the shank fully into the alley with the ball head seated in the socket formed between the twin loops, as in the condition of Fig. 2.

The novel attaching means is readily applicable to a standard trolling or like spoon, such as shown in Fig. 7, and in this and all analogous open type constructions which do not have a body, such as the plug 10, closely proximate to the twin-loop socket to aid in guarding the shank passage 17A which is formed adjacent the crossed-over free end portion 18A of the wire, it is desirable to have the wire of spring stock and to turn the first loop 17 almost closed, leaving an entrance 17AX for the hook shank which is normally smaller than the diameter of the latter so that the shank must be forced into this entrance. This substantially closed type of entrance passage 17AX prevents escape of the hook from its seat in the remote likelihood of peculiar movements which a hooked fish or excursions of the bait into weeds and stumps can sometimes cause. When the shank entrance is as close to a plug body as shown in Figs. 3 and 5, for example, there is so little likelihood of accidental escape of the hook that special precautions for guarding the entrance portions are not needed as a practical matter.

In the construction shown in Fig. 7 the twin-loop ball socket 15Z is formed as an integral part of a main rod or stem member 30 having a leader eye 31 at the opposite end, and a spoon or other lure appendage 32 suitably attached thereto. So far as the hook-attaching means is concerned, the operation of this embodiment is the same as described heretofore, in that the shank portion 13Z of a hook is worked into the narrowed or substantially closed entrance 17 and manipulated to seat the ball head 14Z thereon between the twin loops.

The essential difference in the modification of Fig. 7 resides in the integral formation of the hook seat with the main supporting or body element of the lure.

2,843,964

In Fig. 8 the type of closed entrance formation 17AX illustrated in the magnified view of Fig. 7 is shown applied to a screw-in type ball receptacle 15Y, with the bight 19Y of the twin loops and the cross-over free end 18AY brought closer to the screw stem 16Y to define a narrowed entrance 17AY, which is calculated to be a tight fit for whatever ball shank is intended to be used, sufficient at least to require a moderate forcing of such shank into or out of the entrance.

While the invention has been illustrated in conjunction with fishing gear, it is not intended to be limited to such applications nor to the details of construction and operation described except as may be required by the appended claims.

I claim:

1. In a fishing lure, a hook having a shank with a spherical head portion, and a seating formation for said head portion on the lure and comprising two side-by-side, spaced-apart, circularly-extensive loops integrally connected and dimensioned to loosely receive and retain therebeween said spherical head portion with the shank thereof disposed in the space between said loops, each of the latter having a free end portion and one of said end portions being secured in the lure while the other and second one of said end portions terminates closely adjacent the first thereof to approximately close off entrance of the shank into said space between the loops, but is yieldable to permit forced entrance or retraction of the shank therepast in working said head portion into and out of seated position as aforesaid.

2. A coupling device of the class described comprising a first member having a shank portion and a ball-like head thereon; and a second member comprising a rod-like element having convoluted portions forming spaced-apart loops defining a socket for said head and having one of said loops substantially closed in a circumferential sense while the second loop is substantially closed save for an end portion juxtaposed to another part of the rod member to define a shank passage by means of which said shank can be manipulated inwardly or outwardly of the second loop to dispose said head in the seat or remove it therefrom.

3. In a device of the class described, separable coupling members one of which includes a stem having a ball head at an end thereof, and the other of which comprises a rod shank with integrally formed twin loops spaced apart in approximately parallel planes a distance to receive and retain said ball head in swivel condition therebetween, said loops being formed by first bending one endwise length of said shank back to form parallel legs joined by a bight at the first bend, with said legs recurved upon themselves in the spaced-apart relation aforesaid to form said loops with the space between said loops constituting a stem alley which is closed at one end by said bight and which is open at its opposite end adjacent said shank, one of said loops being substantially closed by bringing the appertaining end portion of the corresponding recurved leg close to said bight, the other loop being incomplete to leave an entrance opening into said alley at said bight, whereby said stem may be worked into said entrance and alley to manipulate the ball head into seated position between said loops.

4. A socket according to Fig. 6 for a ball head 14 on a stem 13A and including one nearly complete and closed loop 17 and one fully closed loop 18 integrally joined by a bight 19 and spaced apart in approximately parallel planes a predetermined distance to form a stem alley 20 and to receive and seat therebetween said ball head 14, said alley being terminated at one end by said bight and open at its opposite end adjacent the open part of loop 17, the endwise portions of one of said loops 17 which are remote from said bight being spaced from the bight a distance to form an entrance 17A to admit said stem and thence being bent to continue radially away from the appertaining loop 17 and constitute a shank 16, the free end regions 18A of the other loop being brought close to said bight 19 to substantially close the appertaining loop as aforesaid, said stem being laid crosswise of said shank to permit working said ball head into the nearly closed loop and to permit turning said stem into said alley to seat the ball between the loops, and vice versa to unseat the ball head.

5. For use as a coupling, particularly to couple fishhooks to a lure body: a first elongated wire-like member adapted for attachment to a lure body and having end portions turned into a pair of side-by-side loops spaced apart from each other to provide a shank passage to admit therebetween the shank of a second wire-like member adapted for use with a hook means and having fixed at an end thereof a ball head, one of said loops being of a diameter to admit said head therein through the side of said loop, the other said loop being of a diameter to prevent passage sidewise therethrough of said head, and both loops being spaced sufficiently from the appertaining elongated member portions to provide an entrance for passage of the shank of the second member with said head positioned sidewise into said larger loop, whereby the shank of the second member may be turned into said entrance and into said shank passage to secure said head in between said loops so long as the shank portion thereof is kept away from said entrance.

6. In a fishing lure, a main rod body adapted for attachment to a line near one end and having its opposite end portion turned into a ball coupling comprising a pair of spaced-apart, side-by-side ball-enclosing loops one of which is substantially complete and the other of which is incompleted near the rod body by an amount to define a narrow shank entrance leading into a shank alley defined by the space between said loops; said coupling being adapted to receive a hook device having a shank to fit into said entrance and alley, and a ball member thereon of a isze incapable of escaping sidewise in the completed loop, and capable of entering sidewise into the incomplete loop only by manipulation of said shank into said entrance and thence into said alley.

7. In a ball-type coupling, a first coupling member comprising a rod body having an end portion turned into a ball seat consisting of a pair of side-by-side loops spaced apart to define a narrow, nearly circular shank alley which is closed at one end, and open at its opposite end, one of said loops being incomplete circumferentially near the rod body to define thereat a narrow shank entrance juxtaposed to the open end of the alley and leading into the latter; and a second coupling member adapted to cooperate with said first member and consisting of a ball member of a size to fit loosely between said loops but incapable of passing laterally of the alley through the closed loop, said ball member having attached thereto a shank portion of a diameter to fit into said entrance and alley, said incomplete loop permitting coupling passage of the ball member laterally of the alley therethrough to work freely in between the loops responsive to coupling manipulation of the shank portion first into said entrance and then into alley concomitantly with movement of the ball member laterally in between the loops, and with freedom of the shank to move back and forth the length of the alley without escape except by a reverse uncoupling manipulation through said entrance.

8. A twist-type ball and socket coupling comprising a one-piece wire socket consisting of two spaced apart, side-by-side loops forming a seat for a ball head; one of said loops being substantially complete circumferentially and the other being incomplete circumferentially; and a cooperating coupling including at least a narrow rod shank and a ball head thereon; the space between the loops constituting an alley which is closed at one end by a lateral extension integrally cross-connecting the loops, and which alley is open at its opposite end adjacent a lateral free end portion of the closed one of said loops which end portion is offset toward the incomplete loop opposite the incomplete portion thereof, which incomplete portion constitutes an entrance into said alley for said shank of the cooperating coupling member, and by means of which the latter may be manipulated in twist fashion by inserting the shank into the entrance and twisting the same to move the ball head through the incomplete loop in between both loops with said shank turned into said alley.

References Cited in the file of this patent

UNITED STATES PATENTS

| | | |
|---|---|---|
| 363,525 | Lipp | May 24, 1887 |
| 589,821 | Ebeling | Sept. 14, 1897 |
| 745,131 | Abbath | Nov. 24, 1903 |
| 1,303,467 | Ettershank | May 13, 1919 |
| 1,407,118 | Bennett | Feb. 21, 1922 |
| 1,471,959 | Halferty | Oct. 23, 1923 |
| 1,558,731 | Withrow | Oct. 27, 1925 |
| 1,600,653 | Steenstrup | Sept. 21, 1926 |
| 1,744,366 | Davenport | Jan. 21, 1930 |
| 2,648,091 | Jones | Aug. 11, 1953 |
| 2,706,359 | Beames | Apr. 19, 1955 |
| 2,763,089 | McDonald | Sept. 18, 1956 |

FOREIGN PATENTS

| | | |
|---|---|---|
| 102,001 | Austria | Dec. 10, 1925 |